United States Patent [19]

Fujimoto et al.

[11] Patent Number: 4,616,309
[45] Date of Patent: Oct. 7, 1986

[54] NUMERICAL CONTROL SYSTEM

[75] Inventors: Akihiko Fujimoto; Morio Kiyokawa, both of Aichi, Japan

[73] Assignee: Mitsubishi Denki Kabushiki Kaisha, Tokyo, Japan

[21] Appl. No.: 596,194

[22] Filed: Apr. 2, 1984

[30] Foreign Application Priority Data

Apr. 1, 1983 [JP] Japan .................................. 58-57665

[51] Int. Cl.⁴ ........................ G06F 15/46; G05B 19/18
[52] U.S. Cl. ..................................... 364/171; 364/474
[58] Field of Search ................................ 364/167–171, 364/191–193, 474, 475, 188, 189, 146, 147

[56] References Cited

U.S. PATENT DOCUMENTS

| | | | |
|---|---|---|---|
| 4,010,356 | 3/1977 | Evans et al. | 364/171 X |
| 4,152,765 | 5/1979 | Weber | 364/171 X |
| 4,228,495 | 10/1980 | Bernhard et al. | 364/171 X |
| 4,393,449 | 7/1983 | Takeda et al. | 364/474 |
| 4,471,462 | 9/1984 | Kurukake | 364/171 X |
| 4,477,754 | 10/1984 | Roch et al. | 364/171 X |

Primary Examiner—Joseph Ruggiero
Attorney, Agent, or Firm—Sughrue, Mion, Zinn, Macpeak and Seas

[57] ABSTRACT

A numerical control system having a general purpose operating panel which is selectively detachable therefrom. The numerical control system includes a serial data transmitting and receiving section to which external signals are applied, an arithmetic section for performing numerical calculations on data received from the serial data transmitting and receiving section, a memory section for storing data received from the serial data transmitting and receiving section, results of caculations from the arithmetic section and programs, an output section for outputting results of calculations from the arithmetic section and the contents of the memory section as instruction signals to a machine tool, a control section for controlling the serial data transmitting and receiving section, the arithmetic section, the memory section and the output section, and a general purpose operating panel having a general purpose full keyboard and a general purpose display unit. The operating panel is freely connectable to and disconnectable from the serial data transmitting and receiving section.

7 Claims, 9 Drawing Figures

NUMERICAL CONTROL SYSTEM

BACKGROUND OF THE INVENTION

The present invention relates to a numerical control system having a general purpose operating panel which can be attached thereto when necessary.

FIG. 1 is a block diagram showing the arrangement of a conventional numerical control system (hereinafter referred to as an NC system when applicable). The NC system 10, as shown in FIG. 1, includes a setting and displaying section 1, an external operating section 2, a control section 3, a memory section 4, an arithmetic section 5, and an output section 6. In the settng and displaying section 1, a keyboard and a display unit including a cathode-ray tube are mounted on a dedicated operating panel. The section 1 is used when the operator writes programs or performs maintenance. The external operating section 2 is a machine operating panel which is used to externally start and stop the NC system. In FIG. 1, a machine tool 20 is controlled by the NC system 10. The input section for inputting data from an NC tape is not shown.

The setting and displaying section 1 and the control section 3 are shown in FIG. 2 in more detail. The setting and displaying section provided on the dedicated operating panel as described above includes the display unit 1A (which may be a cathode-ray tube or liquid crystal display panel), a setting key unit 1B including a keyboard which has dedicated keys used for programming, a control unit 1C for controlling keying inputs from the setting key unit 1B and contents to be displayed on the display unit 1A, a memory unit 1D in which displayed on the display unit 1A, a memory unit 1D in which display forms have been stored, and a data transmitting and receiving unit 1E for transmitting data to the control section 3 and receiving data from the control section 3. The control section 3 includes a data transmitting and receiving unit 3A for transmitting data to the setting and displaying section 1 and receiving data from the section 1, and a CPU (central processing unit) for controlling instruction data applied to the machine tool 20. Display data to be displayed on the display unit 1A, pilot lamp control signals, etc., is transmitted from the data transmitting and receiving unit 3A of the control section 3 to the data transmitting and receiving unit 1E of the setting and displaying section 1 according to a specified format. Data set by the setting key unit 1B is applied to the data transmitting and receiving unit 3A also according to a specified format.

FIG. 3 shows examples of the display unit 1A and the setting key unit 1B of the setting and displaying section 1 on the dedicated operating panel. FIG. 4 shows an example of the external operating section 2.

The operation of the conventional NC system thus constructed will be briefly described. When it is required to input a program, the keyboard 1B of the setting and displaying section on the operating panel is operated to input the program in an appropriate language, which is then stored in the memroy section 4 under the control of the control section 3. Thereafter, instructions are successively applied through the output section 6 to the machine tool 20 to control the latter according to the work program. The machine tool may be controlled according to data inputted through the input section in the same manner.

As described, the conventional NC system 10 has the dedicated operating panel on which the setting and displaying section 1 is provided. Accordingly, the NC system 10 is physically large, thus requiring a larger space for installation. Therefore, the conventional NC system is disadvantageous in that its installation position is limited and the manufacturing cost thereof is high.

SUMMARY OF THE INVENTION

In view of the foregoing, an object of the invention is to provide a numerical control system with a general purpose operating panel which is attached thereto only when the operator wishes to input programs or perform maintenance.

Another object of the invention is to provide a numerical control system of small size and low manufacturing cost.

The foregoing objects and other objects of the invention have been achieved by the provision of a numerical control system comprising a control section, an arithmetic section, a memory section, an output section and a serial data transmitting and receiving section, in which, according to the invention, a general purpose operating panel, including a general purpose full keyboard and a general purpose display unit, is constructed in such a manner that it can be freely connected to and disconnected from the serial data transmitting and receiving section.

The nature, principle and utility of the invention will become more apparent from the following detailed description and the appended claims when read in conjunction with the accompanying drawings.

DESCRIPTION OF THE PREFERRED EMBODIMENTS

Figure 5:
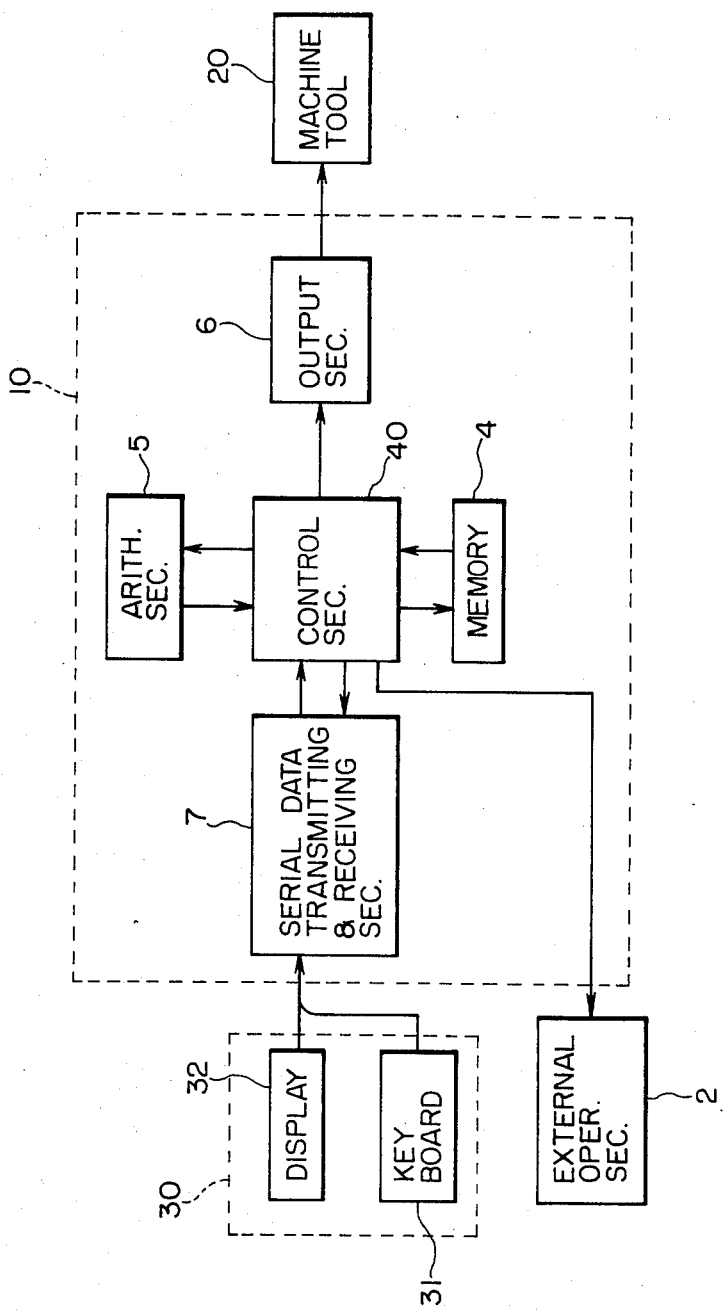
FIG. 5 is a block diagram showing an example of an NC system according to the invention.

FIG. 5 is a block diagram showing a preferred embodiment of a numerical control system of the invention. In FIG. 5, reference numeral 7 designates a serial data transmitting and receiving section arranged in an NC system 10, and 30, and general purpose operating panel on which a general purpose full keyboard 31 and a display unit 32 including a cathode-ray tube or liquid crystal display panel are provided. The operating panel 30 can be freely connected to or disconnected from the serial data transmitting and receiving section 7. The full keyboard 31 and the display unit 32 operate using standardized transfer data codes such as ASCII codes according to a standardized data transfer system such as an RS-232C system (interface standard). Accordingly, a control section 40 in the NC system 10 includes a general purpose code processing unit.

Figure 6:
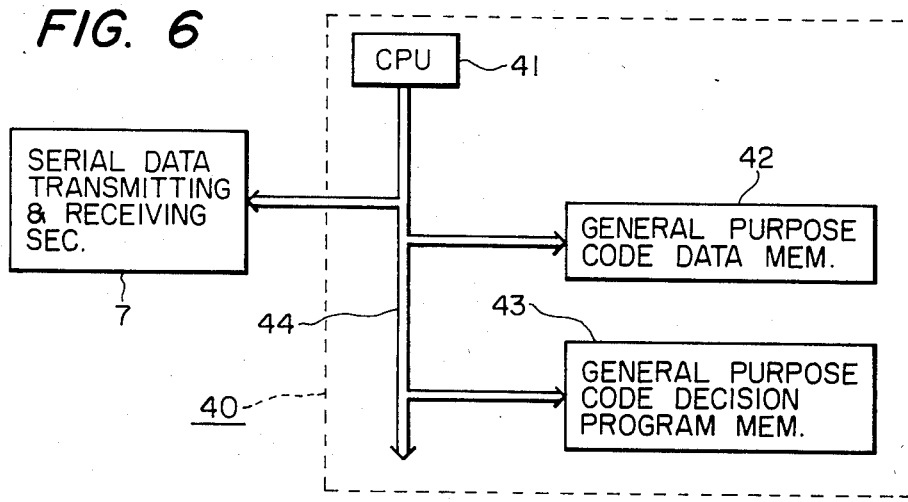
FIG. 6 is a block diagram showing the arrangement of a control section in FIG. 5.

The control section 40, as shown in FIG. 6 in more detail, includes a CPU 41 (central processing unit), a general purpose code data memory 42, a general purpose code decision program memory 43, and an address data control bus 44, which together form the general purpose code processing unit. In the case where the RS-232C system is employed as the data transfer system, the serial data transmitting and receiving section 7 may be implemented with an LSI device such as the device i-8251, which is a serial I/O controller manufactured by Intel Company.

The operation of the aforementioned general purpose code processing unit will be described in brief. First, for instance, keyed ASCII code data is received by the serial data transmitting and receiving section 7. The data thus received is applied through the address data control bus 44 to the CPU 41. Then, the program stored in the general purpose code decision program memory 43 is executed under the control of the CPU 41.

Figure 7:
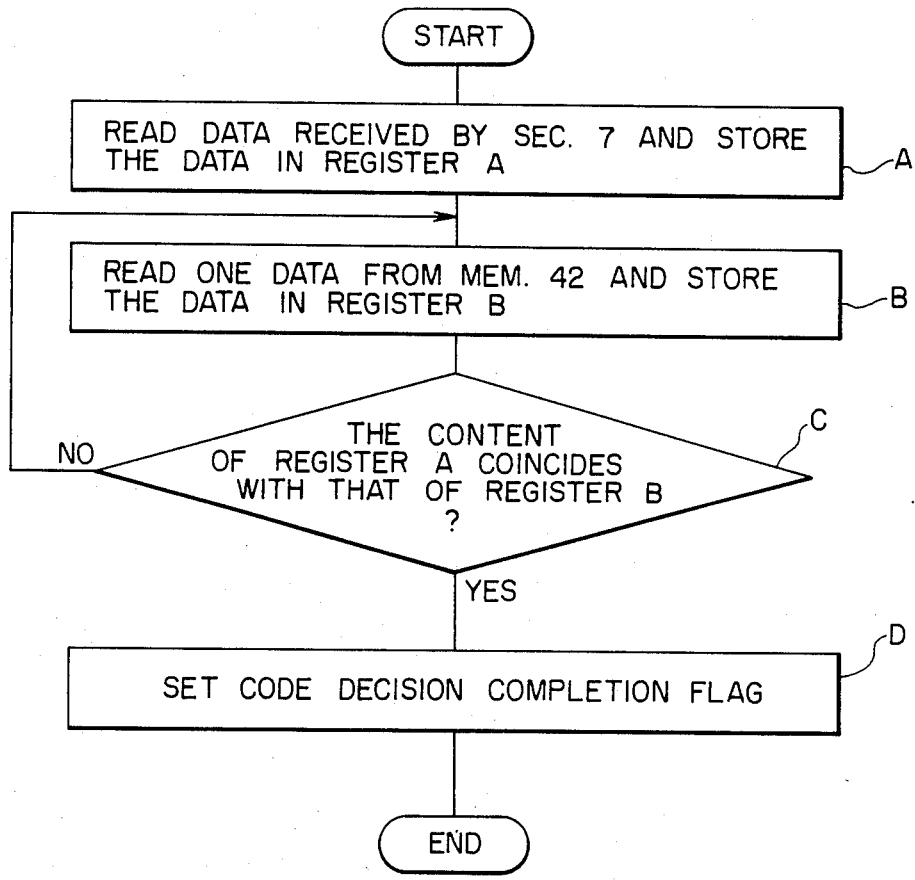
FIG. 7 is a flow chart used for a description of a general purpose code processing operation employed in the invention.

FIG. 7 is a flow chart for the program. First, the data received by the serial data transmitting and receiving section is read and stored in a register A (Step A of FIG. 7). Then, one data point is read out of the general puspose code data memory 42 and is stored in a register B (Step B of FIG. 7). Thereafter, it is determined whether or not the content of the register A coincides with that of the register B (Step C of FIG. 7). The above-described operations (Steps B and C of FIG. 7) are repeatedly carried out until the content of the register A coincides with that of the register B. When these contents coincide with each other, a code desicion completion flag is set (Step D of FIG. 7). The processing of decision codes is carried out in this manner.

The term "general purpose code" as used herein is intended to mean a well-known data code such as an ASCII code or an ISO code, and the term "dedicated code" a special code consisting, for instance, of binary data.

Figure 1:
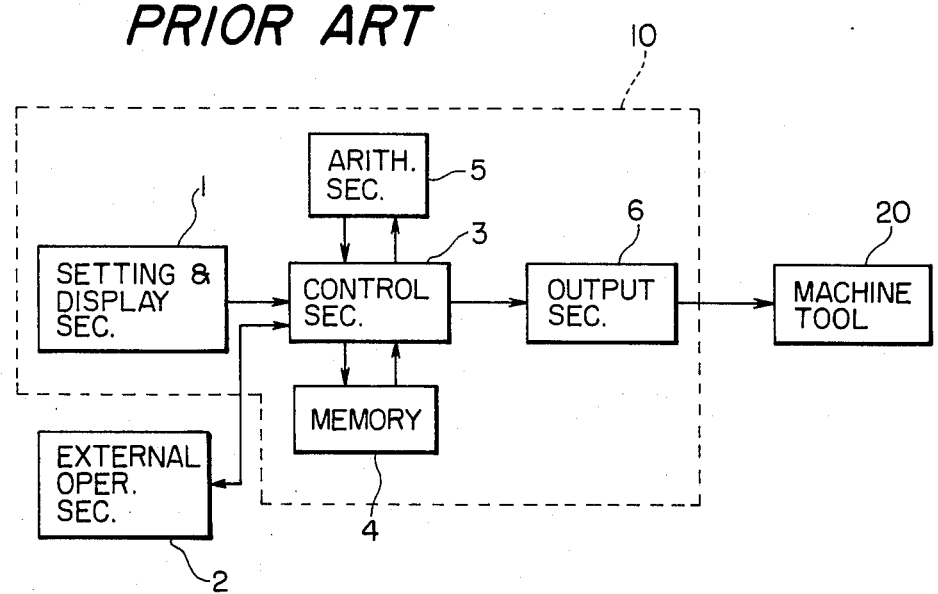
FIG. 1 is a block diagram showing the arrangement of a conventional numerical control system.
Figure 2:
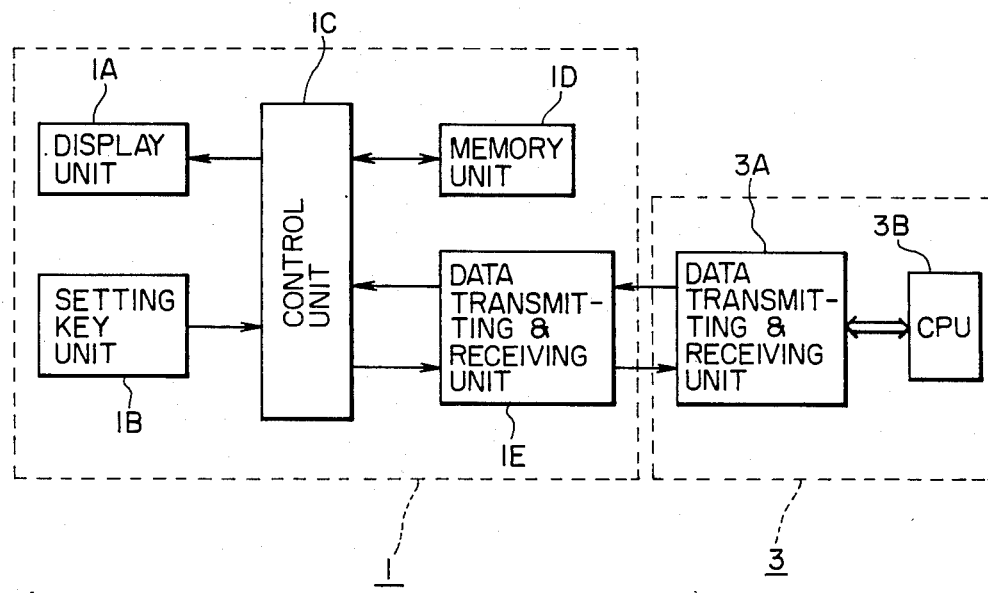
FIG. 2 is a block diagram showing the arrangement of a setting and displaying section and a control section in the NC system shown in FIG. 1.
Figure 3:
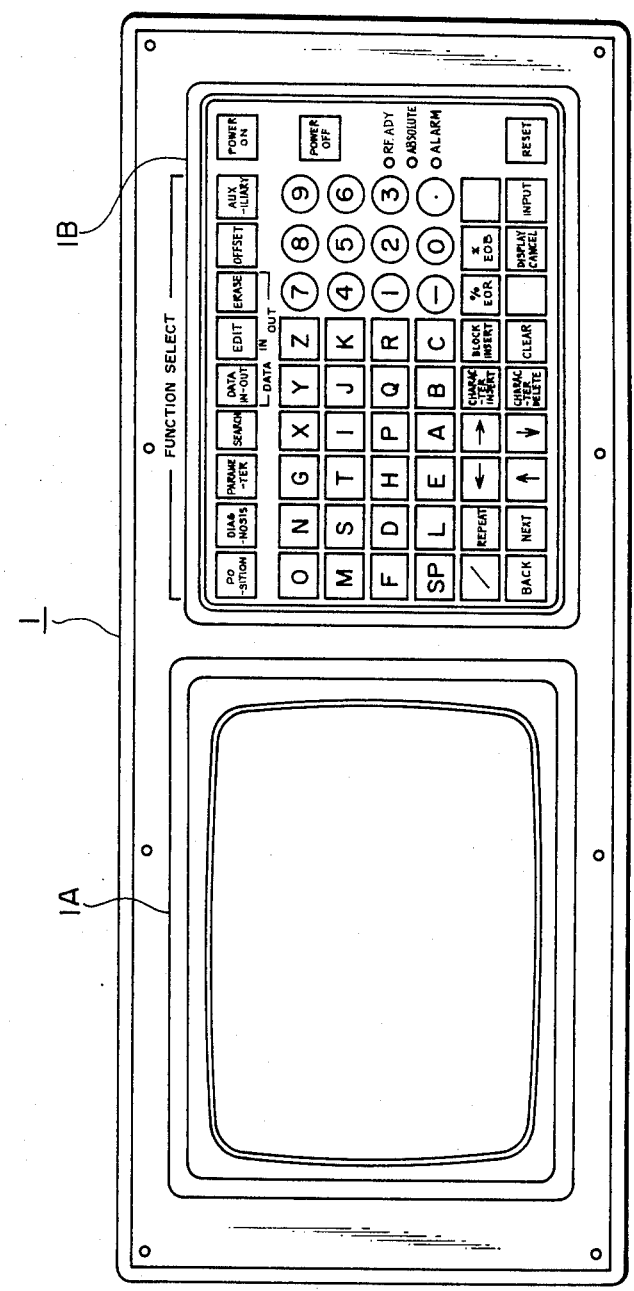
FIG. 3 is a front view showing examples of a display unit and a setting key unit in the setting and displaying section of the conventional NC system of FIG. 1.
Figure 4:
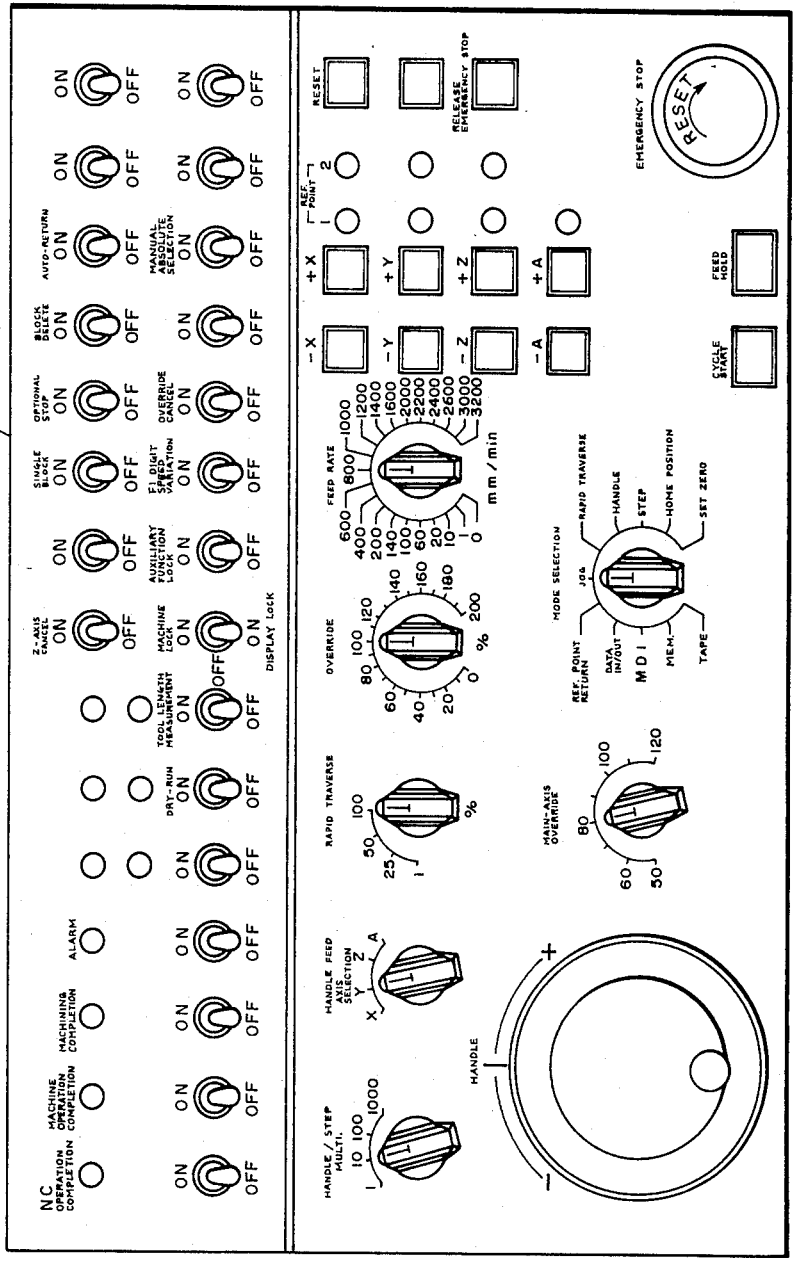
FIG. 4 is an external view showing an example of the panel of an external operating section in the NC system of FIG. 1.
Figure 8:
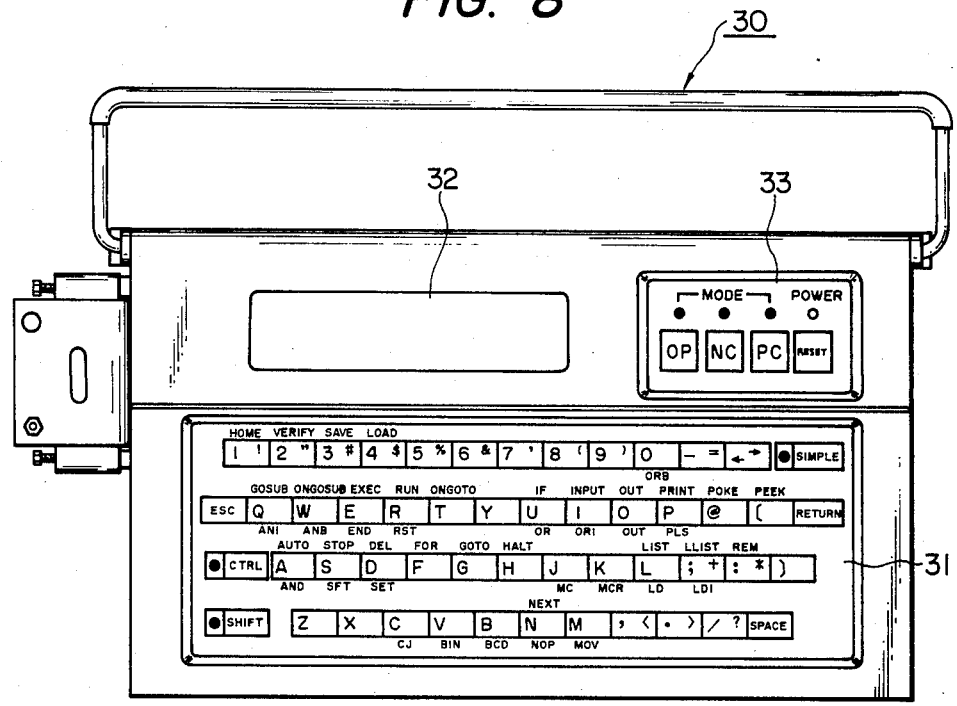
FIG. 8 is an external view showing an example of a general purpose keyboard used in the invention.

In the system in FIG. 5, an external operating section 2 may be the same as that in FIG. 4. An example of the general purpose operating panel 30, as shown in FIG. 8, includes a liquid crystal display unit 31, a mode selecting unit 33, and a full keyboard 31.

The operation of the system shown in FIG. 5 will be described.

Figure 9:
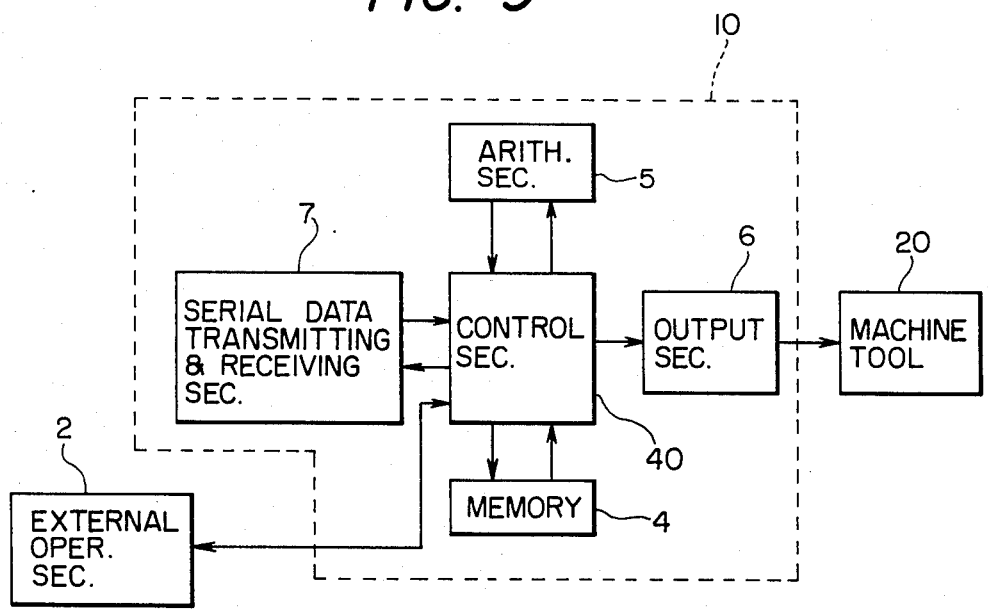
FIG. 9 is a block diagram showing the NC system of the invention in operation.

In a programming operation, the general purpose operating panel 30 is connected to the NC system as shown in FIG. 5 so that the display unit 32 and the full keyboard 31 are coupled to the serial data transmitting and receiving section 7. While referring to the display unit 32, the full keyboard 31 is operated to load a necessary program into the NC system 10. After the programming operation has been accomplished, the general purpose operating panel 30 is disconnected from the NC system 10 as shown in FIG. 9. Under this condition, the external operating section 2 is operated to start and stop the NC system 10, performing necessary control.

The embodiment shown in FIG. 5 will be described in more detail. FIG. 8 shows an example of the general purpose operating panel 30, which includes the display unit 32 and the full keyboard 31 as described above. The display unit 32 is used to display the present data of a tool of the NC system 10, the content of a program in execution, or data necessary for self-diagnosis of the NC system 10. The full keyboard 31 is used to write programs or various data.

In writing an automatic operation program with the general purpose operating panel 30, the full keyboard 31 is operated to cause the display unit 32 to display a picture for writing the program. While referring to the picture thus displayed, the keyboard 31 is operated to input the automatic operating work program. This operation is carried out for writing a program. Therefore, after a program has been inputted, the use of the general purpose operating panel 30 is no longer required.

Automatic operation is started and stopped by operating the external operating section 2. FIG. 4 shows an example of the external operating section 2. When a mode selecting switch at the center of the lower part of the panel of the external operating section 2 in FIG. 4 is operated to select a "MEMORY" mode and a "CYCLE START" push button switch at the lower right corner of the panel is depressed, the automatic operation is started. The automatic operation can be stopped by depressing a "FEED HOLD" bush button switch adjacent to the "CYCLE START" push button switch.

As is apparent from the above description, it is not necessary to maintain the general purpose operating panel 30 connected to the NC system, and it is essential to maintain the external operating section 2 connected to the NC system. Thus, if the panel 30 is so designed that it can be disconnected from the NC system after it has been used or when it is not in use, then the NC system can be simplified in construction and a plurality of NC systems can be driven with one panel.

As was described in detail, according to the invention, a general purpose operating panel made up of the general purpose full keyboard and the general purpose display unit is provided in such a manner that it can be freely connected to and disconnected from the serial data transmitting and receiving section of the NC system. Therefore, the general purpose operating panel is connected to the NC system only when a programming operation is carried out, and it can be disconnected therefrom after the programming operation has been achieved. Accordingly, the NC system can be made smaller in size and lower in manufacturing cost. The employment of the general purpose operating panel according to the invention is economical because it can be used for a plurality of NC systems.

We claim:

1. A numerical control system comprising:
   a serial data transmitting and receiving section to which external signals are applied;
   an arithmetic section for performing predetermined operations on data received from said serial data transmitting and receiving section;
   a memory section for storing data from said serial data transmitting and receiving section, results of calculations from said arithmetic section, and programs;
   an output section for outputting results of calculations from said arithmetic section and contents of said memory section as instruction signals to a machine tool;
   a control section for controlling said serial data transmitting and receiving section, arithmetic section, memory section and output section; and a general purpose operating panel comprising a general purpose full keyboard and a general purpose display unit, said operating panel being freely connectible to and disconnectable from said serial data transmitting and receiving section;

wherein said control section comprises a general purpose code processing unit comprising:

a general purpose code decision program memory in which is stored a decision program for determining whether data received by said serial data transmitting and receiving section is in a format of a general purpose code;

a general purpose code data memory in which a general purpose code is stored;

a data control bus for delivering data from said serial data transmitting and receiving section; and a central processing unit for determining according to said general purpose decision program said data received by said serial data transmitting and receiving section and delivered thereto through said address data control bus; and wherein said general purpose code decision program comprises:

a step of inputting said data received by said serial data transmitting and receiving section into a first register;

a step in which one data point is read out of said general purpose code data memory and inputted into a second register;

a step of determining whether or not contents of said first and second registers coincide with each other; and a step in which, when said contents of said first and second registers coincide with each other, a code decision completion flag is set.

2. The numerical control system as claimed in claim 1, wherein said display unit comprises means for displaying input data from said full keyboard and transmission data from said serial data transmitting and receiving section.

3. The numerical control system as claimed in claim 2, wherein said display unit comprises a cathode-ray tube.

4. The numerical control system as claimed in claim 2, wherein said display unit comprises a liquid crystal display unit.

5. The numerical control system as claimed in claim 1, wherein said general purpose code is an ASCII code.

6. The numerical control system as claimed in claim 1, wherein said general purpose code is an ISO code.

7. The numerical control system as claimed in claim 1, wherein said serial data transmitting and receiving section employs and RS-232C system as a data transfer system.

* * * * *